United States Patent

Wiart et al.

[15] 3,675,585

[45] July 11, 1972

[54] HANDLING CONVEYORS HAVING SELF-PROPELLED TROLLEYS

[72] Inventors: Albert Wiart, Sannois; Simon Cynober, Paris, both of France

[73] Assignee: Jeumont-Schneider, Paris, France

[22] Filed: Mar. 15, 1971

[21] Appl. No.: 123,967

[30] Foreign Application Priority Data

March 17, 1970 France .................................. 7009480

[52] U.S. Cl. ........................ 104/148 LM, 318/38, 318/135, 310/13
[51] Int. Cl. ...................................................... H02k 41/02
[58] Field of Search .................. 318/38, 121, 135; 104/148, 104/148 LM; 198/41; 310/12–14

[56] References Cited

UNITED STATES PATENTS

| 3,356,041 | 12/1967 | Bliss .................................... 310/12 X |
| 3,361,081 | 1/1968 | Bliss .................................... 318/135 X |
| 3,368,496 | 2/1968 | Falk et al. ........................... 104/148 X |

*Primary Examiner*—D. F. Duggan
*Attorney*—Raymond A. Robic

[57] ABSTRACT

A process which relates more particularly to handling of conveyors having off-level sections in their path. The process is characterized in that in every section which is other than level, at least one of the side armatures of the conveyor is omitted and replaced by an a.c. energized auxiliary linear motor field. While a self-propelled trolley is moving in the section other than level, at least one of the fields of the trolley, namely the field corresponding to the omitted side armature, is disconnected from its energizing a.c. circuit by appropriate means and simultaneously connected to variable impedances so as to behave like an armature in relation to the auxiliary field, the impedances behaving like armature impedances, so that the system takes the form of an auxiliary variable-speed linear motor associated with each off-level section. The auxiliary linear motor provides the power or extra power for driving or retarding the trolley while the same is travelling in the off-level, the trolley speed in the off-level section thus being maintained substantially equal to the trolley speed in the level zones.

4 Claims, 3 Drawing Figures

HANDLING CONVEYORS HAVING SELF-PROPELLED TROLLEYS

This invention is used in the continuous handling of separate loads and relates to conveyors having self-propelled trolleys driven by linear induction motors, wherein the paths of the conveyors comprise off-level sections.

The paths of known conveyors of this kind must be in a horizontal plane. Therefore, to pass through an off-level section, it requires varying the driving power of the self-propelled trolley and, more particularly, increasing such power on upgrades. There appears to be at present no economic way of permanently adapting the driving power to the shape of the circuit, although the man skill in the art could devise many solutions of the problem, such as dimensioning the trolley motors for the maximum driving power required on upgrades or else applying a higher voltage at a higher frequency to the trolley motors in off-level sections. A disadvantage of such solutions is that the trolley becomes heavier and larger or that auxiliary power supplies are needed which produce inadequate drive speeds, or that the trolley motors overheat in off-level sections.

The invention solves the problem of permanently adapting trolley drive power to conveyor circuit shape while obviating the disadvantages referred to, by using a conveyor having self-propelled trolleys driven by linear motors which are dimensioned for on-level operation even if the path of the conveyor comprises off-level sections. In the improvement according to the invention, the extra power which the trolley needs to travel through the off-level zones at substantially the same speed as the level zones is provided by adding to at least one inclined side wall of the conveyor at least one linear motor field whose armature is the field of a linear motor of the trolley, such field being connected in some appropriate fashion to impedance instead of directly to its supply. The applicants' United States Patent application Ser. No. 79,942 filed Oct. 12, 1970 discloses an exemplary handling conveyor having a self-propelled trolley driven by linear motors wherein each trolley has a field on each side wall, the corresponding armature being secured to the conveyor side wall opposite to the trolley side wall concerned; however, without departing from the scope of the invention the trolley can equally well have just a single drive system on one of its side walls.

The improvement according to the invention, which relates more particularly to conveyors having off-level sections in their path, is characterized by all the following features:

a. in every section which is other than level, the armature or at least one of the side armatures of the conveyor is omitted and replaced by an a.c. energized auxiliary linear motor field;

b. while a self-propelled trolley is moving in the section other than level, the field or at least one of the fields of the trolley, namely the field corresponding to the omitted side armature, is disconnected from its energizing a.c. circuit by appropriate means and simultaneously connected to variable impedances so as to behave like an armature in relation to the auxiliary field, the impedances behaving like armature impedances, so that the system takes the form of an auxiliary variable-speed linear motor associated with each off-level section;

c. the auxiliary linear motor provides the power or extra power for driving or retarding the trolley while the same is travelling in the off-level section, the trolley speed in the off-level section thus being maintained substantially equal to the trolley speed in the level zones.

The auxiliary linear motor can provide considerably greater power than the trolley linear motor, since the current flowing through the armature of the auxiliary linear motor — which armature was previously the trolley field — does not contain the component of the magnetizing current for the trolley linear motor. The magnetizing current is usually substantial because of the large air gap in the last-mentioned motor. The air gap comprises not only the normal mechanical clearance but also the thickness of the armature plate on the conveyor, such plate being usually made of copper or aluminum which are non-magnetic materials. Consequently, a trolley field operating as an armature on the same current behaves as if its power had risen considerably. For a given amount of heating, therefore, the trolley driving power can be at least doubled in off-level sections, thus solving all the problems arising in practice.

In a first embodiment of the invention wherein the trolleys are driven by at least one linear motor whose field is secured to a trolley side wall and whose armature, in the form of a solid non-magnetic metal plate, is secured to the corresponding side wall of the conveyor, such side wall being made of a magnetic material, the conveyor side armature or at least one of the conveyor side armatures is omitted in any part of the conveyor path and is replaced by a wound armature connected to variable impedances, for improved trolley driving power and braking.

In a second embodiment of the invention, immediately upstream and downstream of an off-level section the or each conveyor side armature and the or each a.c. contact supply line for the or each corresponding field of the trolleys are interrupted over a distance corresponding substantially to the length of one trolley in the direction of its movement.

In a third embodiment of the invention, the trolleys have a double side drive with a linear motor on each side wall, and immediately upstream and downstream of an off-level section the conveyor side armatures and the a.c. contact supply lines for the trolley fields are formed with gaps corresponding substantially to the length of a trolley in the direction of its movement, so that the gaps associated with each trolley linear motor are offset from one another in the direction of travel by substantially twice the trolley length.

In a fourth embodiment of the invention, an auxiliary field is also disposed in a level zone for improved retarding and starting of trolleys in such zone.

In a fifth embodiment of the invention, to equalize the speed of a number of trolleys disposed in any conveyor zone, only identical kinds of wound-armature driving motors are used in such zone, the fields of such motors being connected in parallel to the same supply, the wound armatures of such motors being connected in parallel to a common system of variable impedances, for in such conditions of course the driving motors behave like synchronous motors whatever trolley loading may be, in view of the considerable slip of linear motors.

The invention will be better understood from the following description of an embodiment and from the accompanying drawings wherein.

Figure 1:
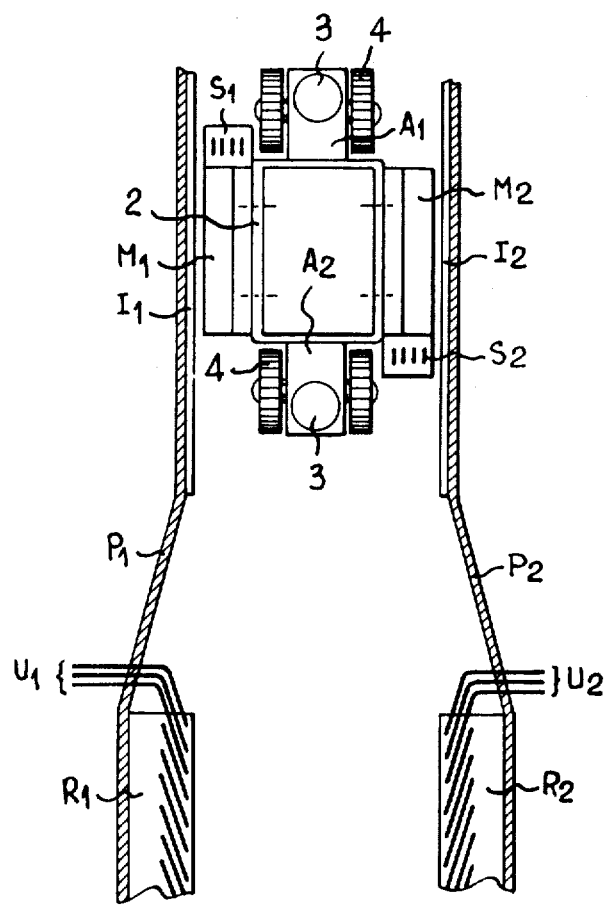
FIG. 1 is an exemplary plan view of part of the conveyor according to the invention, showing the trolley in a level zone, an off-level zone being shown at the bottom of FIG. 1.
Figure 2:
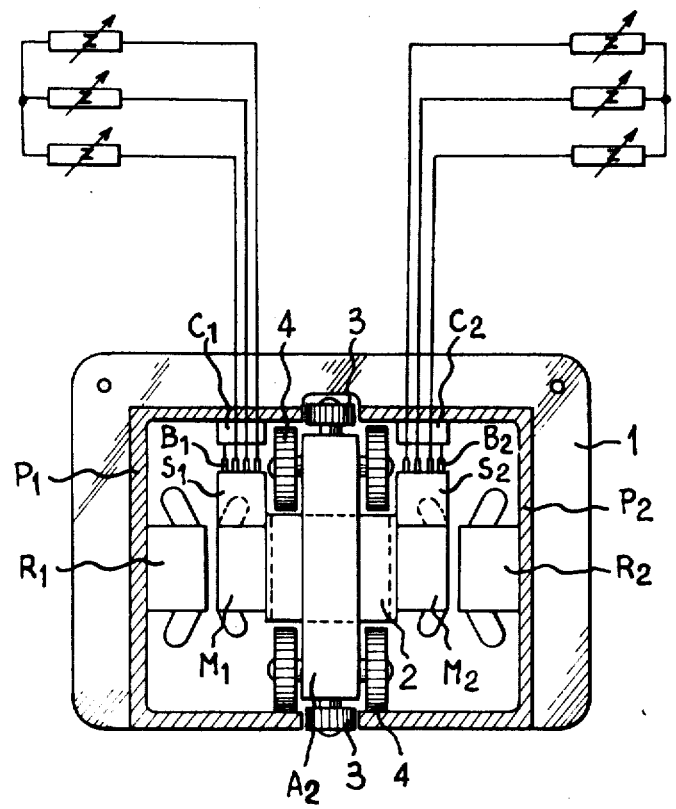
FIG. 2 is an elevation view of the conveyor of FIG. 1 taken along a vertical cross-section, in an off-level zone.

As can be seen in FIGS. 1 and 2, a conveyor track or runway or the like for the trolley shown comprises two U-shaped sections members $P_1$, $P_2$ placed opposite one another and rigidly connected by stirrup-shaped members, such as member 1, which are also used to secure and retain the track. The trolley comprises a rigid rectangular box structure 2 having secured to its two side surface two back-to-back three-phase linear motor fields $M_1$, $M_2$, and to its front and rear surfaces two vertical uprights $A_1$, $A_2$ which bear the spindles of the guiding members. The guiding members consist of four pairs of running rollers 4 and four centering rollers 3 so distributed at the top and bottom of the trolley as to act on the inside surfaces and the edges of the flanges of the U-shaped members $P_1$, $P_2$, respectively. The top over-hangs of the fields $M_1$, $M_2$ are embedded in plastics to form boxes $S_1$, $S_2$, and two sets of brushes $B_1$, $B_2$ are secured by appropriate means to the top surface of the latter boxes and also to the field windings. Registering with these brush sets, which are so disposed at opposite top ends of the fields so as to be on a trolley diagonal, are two layers of drive current supply conductors which are mounted on insulated supports $C_1$, $C_2$ secured to the inside surface of the top flanges of the U-shaped members. When the trolley runs level, the fields $M_1$, $M_2$ move past armatures $I_1$, $I_2$ in the form of a usually copper or aluminum stationary conductive plate disposed on the inside of the web of the members $P_1$ and $P_2$ which forms the conveyor track.

The top part of FIG. 1 relates to a level zone and the bottom part to an off-level zone in which there can be seen two auxiliary fields $R_1$, $R_2$ secured to the conveyor walls. The windings of the latter fields, whose overhangs are shown diagrammatically, are three-phase in the example chosen and their ends have the references $U_1$, $U_2$ respectively.

Immediately upstream of a change of gradient the armature plates $I_1$, $I_2$ and the contact lines (not shown) of the fields $M_1$, $M_2$ are interrupted for a distance slightly more than the spacing of the brushes $B_1$, $B_2$ lengthwise of the conveyor path so that the energization of the fields $M_1$, $M_2$ can be completely interrupted when the trolley approaches a change of level. The fields $M_1$, $M_2$ are then connected to variable three-phase impedances Z so as, upon arrival opposite auxiliary fields $R_1$, $R_2$, to operate as armatures for such auxiliary fields; the trolley is then driven by this system, which can provide at least twice the power of the system of motors $M_1$ $I_1$ and $M_2$ $I_2$ used for level running.

In FIG. 1 the gaps in the armatures $I_1$, $I_2$ are disposed symmetrically of the conveyor axis, the trolley usually being able to coast through the gap zone.

Figure 3:
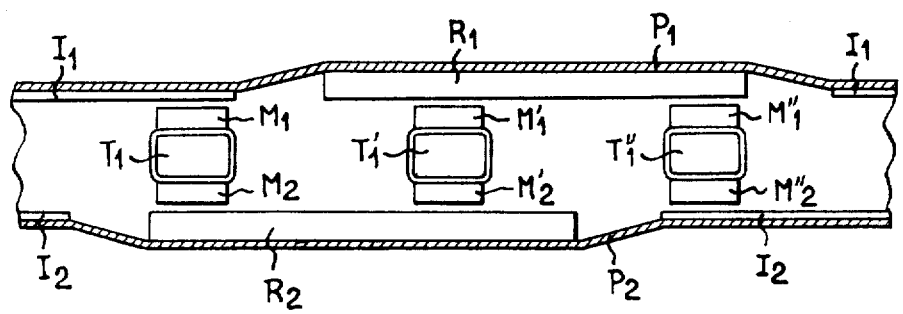
FIG. 3 is a diagrammatic plan view of the conveyor in an off-level zone, with staggering of the armatures and fields on the conveyor side walls.

FIG. 3 shows as a variant another example of staggering of the gaps on either side of the axis by slightly more than twice the spacing of the brushes $B_1$ and $B_2$ lengthwise of trolley movement. This feature enables the trolley to be driven continuously at any speed. Indeed, through appropriate switching and selecting facilities the trolley at position $T_1$ is driven simultaneously by motor $M_1$ $I_1$ and by motor $M_2$ $R_2$; when the trolley moves to the right only the motor $M_2$ $R_2$ operates, since the armature $I_1$ is dead. In the zone of the fields $R_1$, $R_2$, for instance, in position $T'_1$, the trolley is driven by the two motors $M'_1 R_1$ and $M'_2 R_2$. In position $T''_1$, the trolley is driven by the two motors $M''_1 R_1$ and $M''_2 I_2$. Immediately after this position only the motor $M''_2 I_2$ operates, whereafter the trolley is driven by its own linear motors having the armatures $I_1$ and $I_2$ respectively.

In change-of-gradient zones, therefore, at least one driving motor is always in operation. Everything hereinbefore stated about trolley driving is applicable to trolley braking by known means such as reverse-current braking or field d.c. injection braking.

The provision of two drive systems on the trolleys and on the conveyor side walls permits an improved use of the linear motors in accordance with the power requirements in off-level sections, but if required only a single set of motors need be used.

The facility used in off-level zones can also be used in level zones for improved trolley braking and starting.

The improved conveyor according to the invention can be used for the continuous handling of separate loads in all cases in which the conveyor path has off-level sections or sections calling for a considerable variation in trolley driving power. The conveyor can be of the overhead or underfloor type.

We claim:

1. Improvement in handling conveyors moving in level and off-level zones and equipped with self-propelled trolleys driven by means of two linear induction motors each including a field mounted on one of the side walls of each trolley and fed by a set of contacts adapted to slide on electric supply lines, and an armature mounted on the corresponding side wall of the conveyor, the two sets of contacts being spaced by a predetermined distance longitudinally of the trolley, comprising the steps of:

a. replacing, in the off-level zones of the conveyor, said electric supply lines by auxiliary lines connecting the terminals of said field to variable impedances, and said armature by an auxiliary field which is placed along said off-level zones and fed by an a.c. voltage source, so as to form an auxiliary linear motor having a variable speed and an increased power, and in which the regular field of the trolley now acts as a wound armature; and b. spacing, in the area of the off-level zones, the armature and the auxiliary field mounted on the side wall of the conveyor as well as the electric supply lines and the auxiliary lines by a gap slightly longer than the distance between the two sets of contacts.

2. An improvement according to claim 1, wherein the gaps associated with each trolley auxiliary linear motor and located on opposite walls of the conveyor are offset from one another in the direction of travel by substantially twice the trolley length, whereby continuous driving and braking of the trolley can be provided.

3. An improvement according to claim 1, wherein the auxiliary field is also disposed in a level zone for improved retarding and starting of trolleys in such zone.

4. An improvement according to claim 1, wherein to equalize the speed of a number of trolleys disposed in any conveyor zone, only identical kinds of wound-armature auxiliary motors are used in such zone, the fields of such motors being connected in parallel to the same voltage source, the wound armatures of such motors being connected in parallel to a common system of variable impedances.

* * * * *